United States Patent
Chiueh et al.

(10) Patent No.: US 10,284,361 B2
(45) Date of Patent: May 7, 2019

(54) CHANNEL SKEW CALIBRATION METHOD AND ASSOCIATED RECEIVER AND SYSTEM

(71) Applicant: MEDIATEK INC., Hsin-Chu (TW)

(72) Inventors: Li-Hung Chiueh, Hsinchu (TW); Tse-Hsien Yeh, New Taipei (TW); Chen-Yu Hsiao, Pingtung County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/927,077

(22) Filed: Mar. 20, 2018

(65) Prior Publication Data
US 2018/0323953 A1 Nov. 8, 2018

Related U.S. Application Data

(60) Provisional application No. 62/501,951, filed on May 5, 2017.

(51) Int. Cl.
*H04L 7/00* (2006.01)

(52) U.S. Cl.
CPC .......... *H04L 7/0041* (2013.01); *H04L 7/0079* (2013.01); *H04L 7/0091* (2013.01)

(58) Field of Classification Search
CPC .... H04L 7/0041; H04L 7/0079; H04L 7/0091
See application file for complete search history.

(56) References Cited

U.S. PATENT DOCUMENTS

| | | | |
|---|---|---|---|
| 6,892,314 B2 | 5/2005 | Chen | |
| 8,886,988 B2 | 11/2014 | Lin et al. | |
| 9,485,080 B1 | 11/2016 | Duan | |
| 2015/0381340 A1* | 12/2015 | Pandey | H04B 3/00 375/226 |
| 2018/0152282 A1* | 5/2018 | Choi | H03K 5/133 |

\* cited by examiner

*Primary Examiner* — Vineeta S Panwalkar
(74) *Attorney, Agent, or Firm* — Winston Hsu

(57) ABSTRACT

The present invention provides a receiver, wherein the receiver includes a plurality of receiving circuit and a skew detection and alignment circuit. The receiving circuit is arranged for receiving a plurality of input signals from a plurality of channels, wherein each of the receiving circuits receives at least one of the input signals to generate an output signal. The skew detection and alignment circuit is arranged for determining skew information according to at least one of the input signals and the output signals, wherein the skew information is used to control delay amounts corresponding to the input signals or the output signals.

13 Claims, 8 Drawing Sheets

CHANNEL SKEW CALIBRATION METHOD AND ASSOCIATED RECEIVER AND SYSTEM

CROSS REFERENCE TO RELATED APPLICATIONS

This application claims the priority of U.S. Provisional Application No. 62/501,951, filed on May 5, 2017, which is included herein by reference in its entirety.

BACKGROUND

C-PHY is a standard for a high-speed, rate-efficient PHY, mostly suitable for mobile applications. In the C-PHY specification, each link comprises three transmitting circuits and three receiving circuits, and each receiving circuit receives signals from two of the transmitting signals to generate an output signal. Since paths between transmitting circuits and the receiving circuits have different lengths, the signals received by the receiving circuits may have different delay amounts. This phenomenon is called skew, which influences following signal processing steps.

SUMMARY

It is therefore an objective of the present invention to provide a system to calibrate the channel skew, to solve the above-mentioned problems.

According to one embodiment of the present invention, a receiver is provided, wherein the receiver includes a plurality of receiving circuit and a skew detection and alignment circuit. The receiving circuit is arranged for receiving a plurality of input signals from a plurality of channels, wherein each of the receiving circuits receives at least one of the input signals to generate an output signal. The skew detection and alignment circuit is arranged for determining skew information according to at least one of the input signals and the output signals, wherein the skew information is used to control delay amounts corresponding to the input signals or the output signals.

According to another embodiment of the present invention, a signal processing method is provided. The signal processing method comprises: using a plurality of receiving circuit to receive a plurality of input signals from a plurality of channels, wherein each of the receiving circuits receives at least one of the input signals to generate an output signal; and determining skew information according to at least one of the input signals and the output signals, wherein the skew information is used to control delay amounts corresponding to the input signals or the output signals.

According to another embodiment of the present invention, a system comprises a transmitter, a plurality of channels and a receiver. The transmitter comprises a plurality of adjustable delay circuits for delaying a plurality of transmitting signals to generate a plurality of delayed transmitting signals. The receiver comprises a plurality of receiving circuits, a skew detection and alignment circuit and a side-band controller. The receiving circuits are arranged for receiving the delayed transmitting signals from the channels, wherein each of the receiving circuits receives at least one of the delayed transmitting signals to generate an output signal. The skew detection and alignment circuit is arranged for determining skew information according to at least one of the delayed transmitting signals and the output signals. The side-band controller is arranged for transmitting the skew information to the transmitter to control the adjustable delay circuits.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
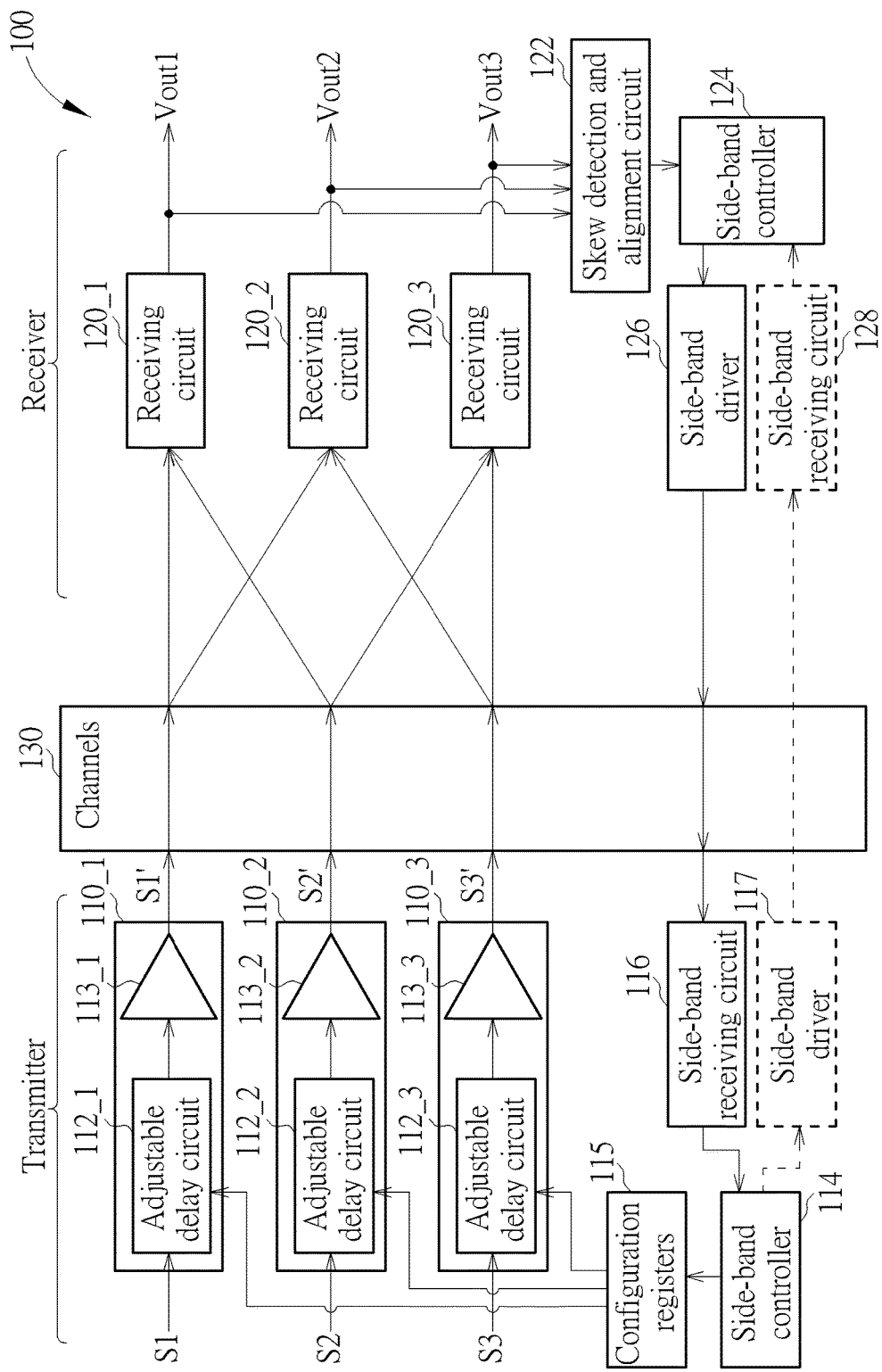
FIG. 1 is a diagram illustrating a system according to a first embodiment of the present invention.

FIG. 1 is a diagram illustrating a system 100 according to a first embodiment of the present invention. As shown in FIG. 1, the system 100 comprises a transmitter, a receiver and a plurality of channels 130 coupled between the transmitter and the receiver, where the channels 130 may be implemented by any conductive wires or lines. The transmitter comprises three transmitting circuits 110_1-110_3, a side-band controller 114, a configuration registers 115, aside-band receiving circuit 116 and a side-band driver 117, where the transmitting circuit 110_1 comprises an adjustable delay circuit 112_1 and a driver 113_1, the transmitting circuit 110_2 comprises an adjustable delay circuit 112_2 and a driver 113_2, and the transmitting circuit 110_3 comprises an adjustable delay circuit 112_3 and a driver 113_3. The receiver comprises three receiving circuits 120_1-120_3, a skew detection and alignment circuit 122, a side-band controller 124, a side-band driver 126 and a side-band receiving circuit 128. In this embodiment, without a limitation of the present invention, the system 100 complies with the C-PHY standard.

In the operations of the system 100, first, the transmitting circuits 110_110_3 are arranged to receive transmitting signals S1-S3 to generate signals S1'-S3', respectively. In detail, the adjustable delay circuit 112_1 delays the transmitting signal S1 to generate the signal S1' via the driver 113_1, the adjustable delay circuit 112_2 delays the transmitting signal S2 to generate the signal S2' via the driver 113_2, and the adjustable delay circuit 112_3 delays the transmitting signal S3 to generate the signal S3' via the driver 113_3. Then, the receiving circuit 120_1 receives the signals S1' and S2' to generate an output signal Vout1, the receiving circuit 120_2 receives the signals S1' and S3' to generate an output signal Vout2, and the receiving circuit 120_3 receives the signals S2' and S3' to generate an output signal Vout3. In this embodiment, each of the receiving circuits 120_1-120_3 is implemented by a comparator for comparing the received two signals to generate the output signal. Then, as each of the output signals Vout1-Vout3 represent a difference between two of the signals S1'-S3', the skew detection and alignment circuit 122 can determine the skew information of the signals S1'-S3', and transmit the skew information to the side-band controller 124. In this embodiment, the skew detection and alignment circuit 122 can use the signal having the earliest phase, latest phase or the middle phase to determine the skew information of the signals S1'-S3'. For example, if the signal S1' has the earliest phase, the skew information may comprise the phase difference or delay amount between the signals S1' and S2' and the phase difference or delay amount between the signals S1' and S3'. Then, the side-band controller 124 transmits the skew information to the transmitter via the side-band driver 126, and the side-band controller 114 of the transmitter receives the skew information via the side-band receiving circuit 116, and generate the control parameters to the configuration registers 115, for controlling delay amounts of the adjustable delay circuit 112_1-112_3. The above-mentioned steps are performed to improve the skew issue caused by the paths between the transmitter and the receiver, to lower the phase difference between the signals S1'-S3' received by the receiving circuits 120_1-120_3.

In addition, the side-band driver 117 of the transmitter and the side-band receiving circuit 128 of the receiver are used to confirm that the side-band controller 114 successfully receives the skew information. For example, after receiving the skew information, the side-band controller 114 will transmit a signal to the side-band controller 124 of the receiver via the side-band driver 117 and the side-band receiving circuit 128 to tell the receiver that the skew information is successfully received. It is noted that the side-band driver 117 of the transmitter and the side-band receiving circuit 128 are optional devices, that is, the side-band driver 117 and the side-band receiving circuit 128 can be removed from the system 100 without affecting the normal operations.

In the system 100, the communications between the transmitting circuits 110_1-110_3 and the receiving circuits 120_1-120_3 can be regarded as a main link, and the communication between the side-band controllers 114 and 124 can be regarded as a side-band link. In some embodiments, the side-band link may use a dedicated single wire or a plurality of wires for communications, the side-band link may be single direction or bi-direction, or the side-band link and the main link may share one or more wires within the channels 130. In addition, the system 100 may have more than one main links.

Figure 2:
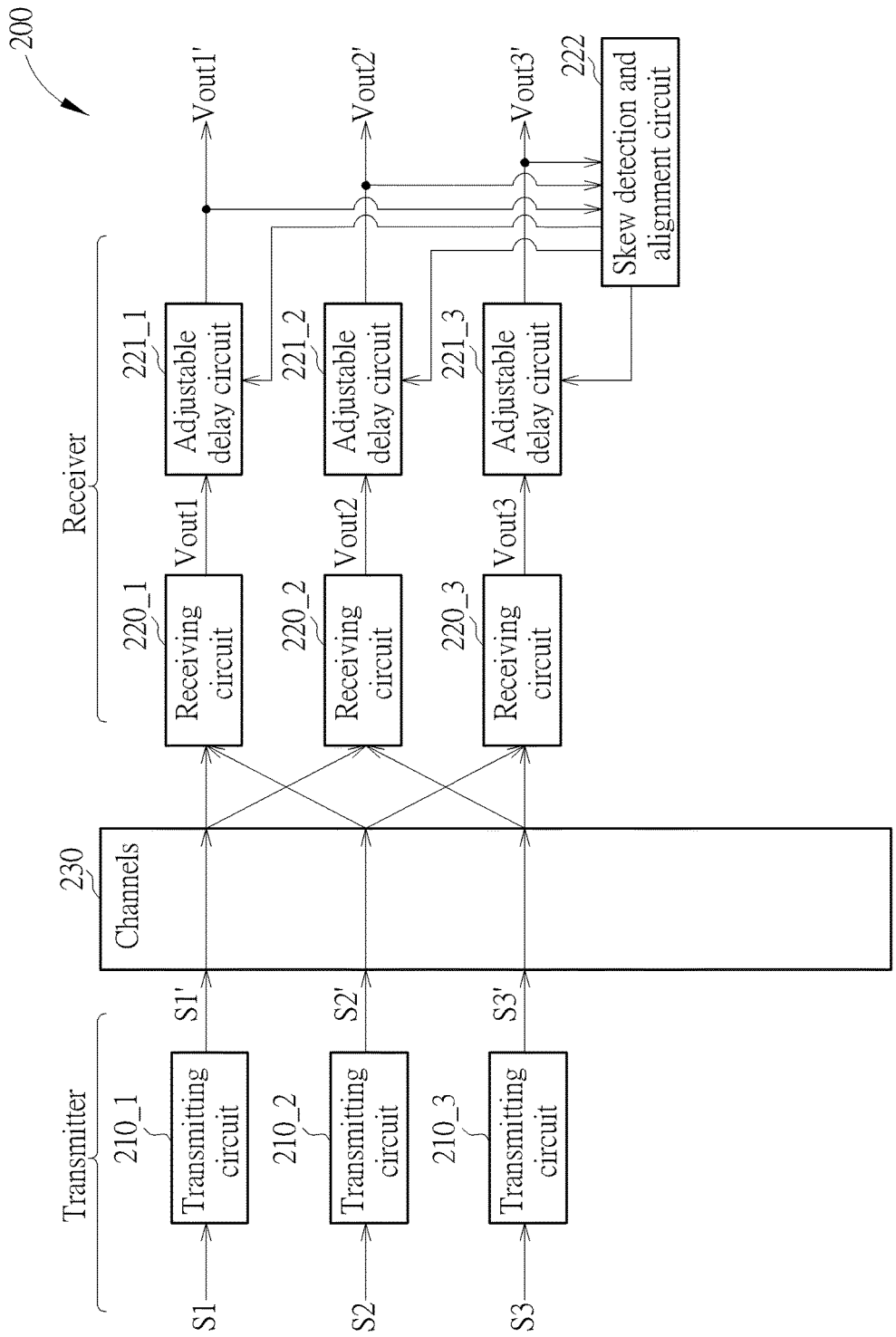
FIG. 2 is a diagram illustrating a system according to a second embodiment of the present invention.

FIG. 2 is a diagram illustrating a system 200 according to a second embodiment of the present invention. As shown in FIG. 2, the system 200 comprises a transmitter, a receiver and a plurality of channels 230 coupled between the transmitter and the receiver. The transmitter comprises three transmitting circuits 210_1-210_3. The receiver comprises three receiving circuits 220_1-220_3, a plurality of adjustable delay circuits 221_1-221_3 and a skew detection and alignment circuit 222. In this embodiment, without a limitation of the present invention, the system 200 complies with the C-PHY standard.

In the operations of the system 200, the transmitting circuits 210_1-210_3 serves as drivers to receive transmitting signals S1-S3 to generate signals S1'-S3', respectively. Then, the receiving circuit 220_1 receives the signals S1' and S2' to generate an output signal Vout1, the receiving circuit 220_2 receives the signals S1' and S3' to generate an output signal Vout2, and the receiving circuit 220_3 receives the signals S2' and S3' to generate an output signal Vout3. In this embodiment, each of the receiving circuits 220_1-220_3 is implemented by a comparator for comparing the received two signals to generate the output signal. Then, the adjustable delay circuits 221_1-221_3 delay the output signals Vout1-Vout3 to generate delayed output signals Vout1'-vout3'. In addition, because of different channel lengths for transmitting the signals S1'-S3', the signals S1'-S3' received by the receiving circuits 220_1-220_3 may have the skew issue, and the output signals Vout1-Vout3 or the delayed output signals Vout1'-Vout3' may also have the skew problem. To solve this problem, the skew detection and alignment circuit 222 determines the skew information of the delayed output signals Vout1'-Vout3', and controls the delay amounts of the adjustable delay circuits 221_1-221_3 according to the skew information. In this embodiment, the skew detection and alignment circuit 222 can use the signal having the earliest phase, latest phase or the middle phase to determine the skew information of the delayed output signals Vout1'-Vout3'. For example, if the delayed output signal Vout1' has the earliest phase, the skew information may comprises the phase difference or delay amount between the delayed output signals Vout1' and Vout2', and the phase difference or delay amount between the delayed output signals Vout1' and Vout2'. Then, the delay amounts of the adjustable delay circuit 221_1-221_3 can be controlled to lower the phase difference between the delayed output signals Vout1'-Vout3', to improve the skew issue caused by the signals S1'-S3'.

In the system 200, the communications between the transmitting circuits 110_1-110_3 and the receiving circuits 120_1-120_3 can be regarded as a main link, and the system 200 may have more than one main links, where each main link has a channel skew calibration mechanism mentioned above.

Figure 3:
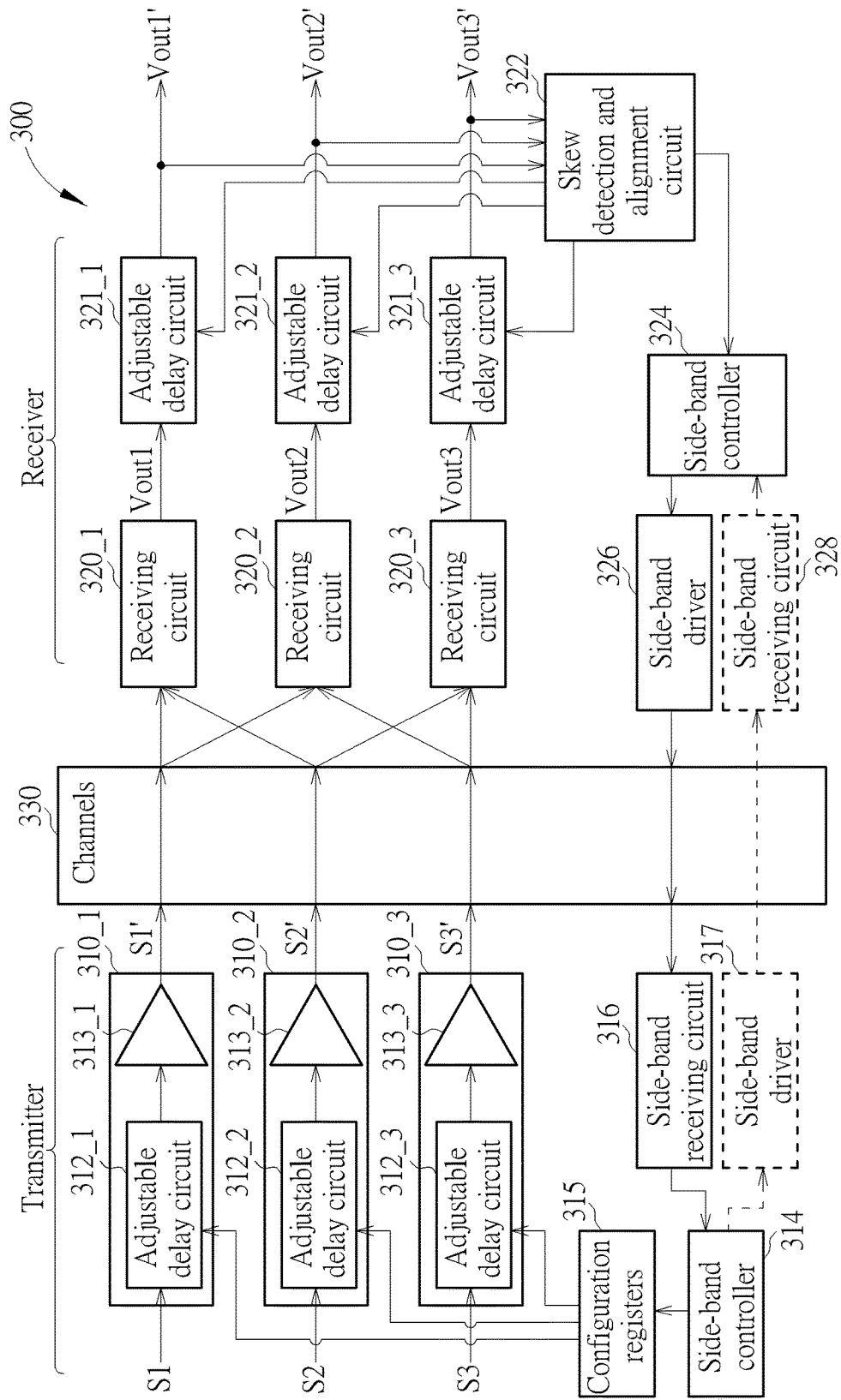
FIG. 3 is a diagram illustrating a system according to a third embodiment of the present invention.

FIG. 3 is a diagram illustrating a system 300 according to a third embodiment of the present invention. As shown in FIG. 3, the system 300 comprises a transmitter, a receiver and a plurality of channels 330 coupled between the transmitter and the receiver. The transmitter comprises three transmitting circuits 310_1-310_3, a side-band controller 314, a configuration registers 315, a side-band receiving circuit 316 and a side-band driver 317, where the transmitting circuit 310_1 comprises an adjustable delay circuit 312_1 and a driver 313_1, the transmitting circuit 310_2 comprises an adjustable delay circuit 312_2 and a driver 313_2, and the transmitting circuit 310_3 comprises an adjustable delay circuit 312_3 and a driver 313_3. The receiver comprises three receiving circuits 320_1-320_3, adjustable delay circuits 321_1-321_3, a skew detection and alignment circuit 322, a side-band controller 324, a side-band driver 326 and a side-band receiving circuit 328. In this embodiment, without a limitation of the present invention, the system 300 complies with the C-PHY standard.

In the operations of the system 300, first, the transmitting circuits 310_310_3 are arranged to receive transmitting signals S1-S3 to generate signals S1'-S3', respectively. In detail, the adjustable delay circuit 312_1 delays the transmitting signal S1 to generate the signal S1' via the driver 313_1, the adjustable delay circuit 312_2 delays the transmitting signal S2 to generate the signal S2' via the driver 313_2, and the adjustable delay circuit 312_3 delays the transmitting signal S3 to generate the signal S3' via the driver 313_3. Then, the receiving circuit 320_1 receives the signals S1' and S2' to generate an output signal Vout1, the receiving circuit 320_2 receives the signals S1' and S3' to generate an output signal Vout2, and the receiving circuit 320_3 receives the signals S2' and S3' to generate an output signal Vout3. In this embodiment, each of the receiving circuits 320_1-320_3 is implemented by a comparator for comparing the received two signals to generate the output signal. Then, the adjustable delay circuits 321_1-321_3 delay the output signals Vout1-Vout3 to generate delayed output signals Vout1'-vout3'. In addition, because of different channel lengths for transmitting the signals S1'-S3', the signals S1'-S3' received by the receiving circuits 220_1-220_3 may have the skew issue, and the output signals Vout1-Vout3 or the delayed output signals Vout1'-Vout3' may also have the skew problem. To solve this problem, the skew detection and alignment circuit 322 determines the skew information of the delayed output signals Vout1'-vout3', and controls the delay amounts of the adjustable delay circuits 321_1-321_3 according to the skew information. In this embodiment, the skew detection and alignment circuit 322 can use the signal having the earliest phase, latest phase or the middle phase to determine the skew information of the delayed output signals Vout1'-vout3'. For example, if the delayed output signal Vout1' has the earliest phase, the skew information may comprises the phase difference or delay amount between the delayed output signals Vout1' and Vout2' and the phase difference or delay amount between the delayed output signals Vout1' and Vout3'. In addition, the skew detection and alignment circuit 322 further transmits the skew information to the side-band controller 324. Then, the side-band controller 324 transmits the skew information to the transmitter via the side-band driver 326, and the side-band controller 314 of the transmitter receives the skew information via the side-band receiving circuit 316, and generate the control parameters to the configuration registers 315, for controlling delay amounts of the adjustable delay circuit 312_1-312_3. The above-mentioned steps are performed to improve the skew issue caused by the paths between the transmitter and the receiver, to lower the phase difference between the delayed output signals Vout1'-Vout3' caused by the signals S1'-S3'.

In the embodiment shown in FIG. 3, both the transmitter and the receiver have the adjustable delay circuits for delaying the signals to improve the skew issue, so the skew calibrations may be more flexible and precise.

In addition, the side-band driver 317 of the transmitter and the side-band receiving circuit 328 of the receiver are used to confirm that the side-band controller 314 successfully receives the skew information. For example, after receiving the skew information, the side-band controller 314 will transmit a signal to the side-band controller 324 of the receiver via the side-band driver 317 and the side-band receiving circuit 328 to tell the receiver that the skew information is successfully received. It is noted that the side-band driver 317 and the side-band receiving circuit 328 are optional devices, that is, the side-band driver 317 of the transmitter and the side-band receiving circuit 328 can be removed from the system 300 without affecting the normal operations.

In the system 300, the communications between the transmitting circuits 310_1-310_3 and the receiving circuits 320_1-320_3 can be regarded as a main link, and the communication between the side-band controllers 314 and 324 can be regarded as a side-band link. In some embodiments, the side-band link may use a dedicated single wire or a plurality of wires for communications, the side-band link may be single direction or bi-direction, or the side-band link and the main link may share one or more wires within the channels 330. In addition, the system 300 may have more than one main links.

Figure 4:
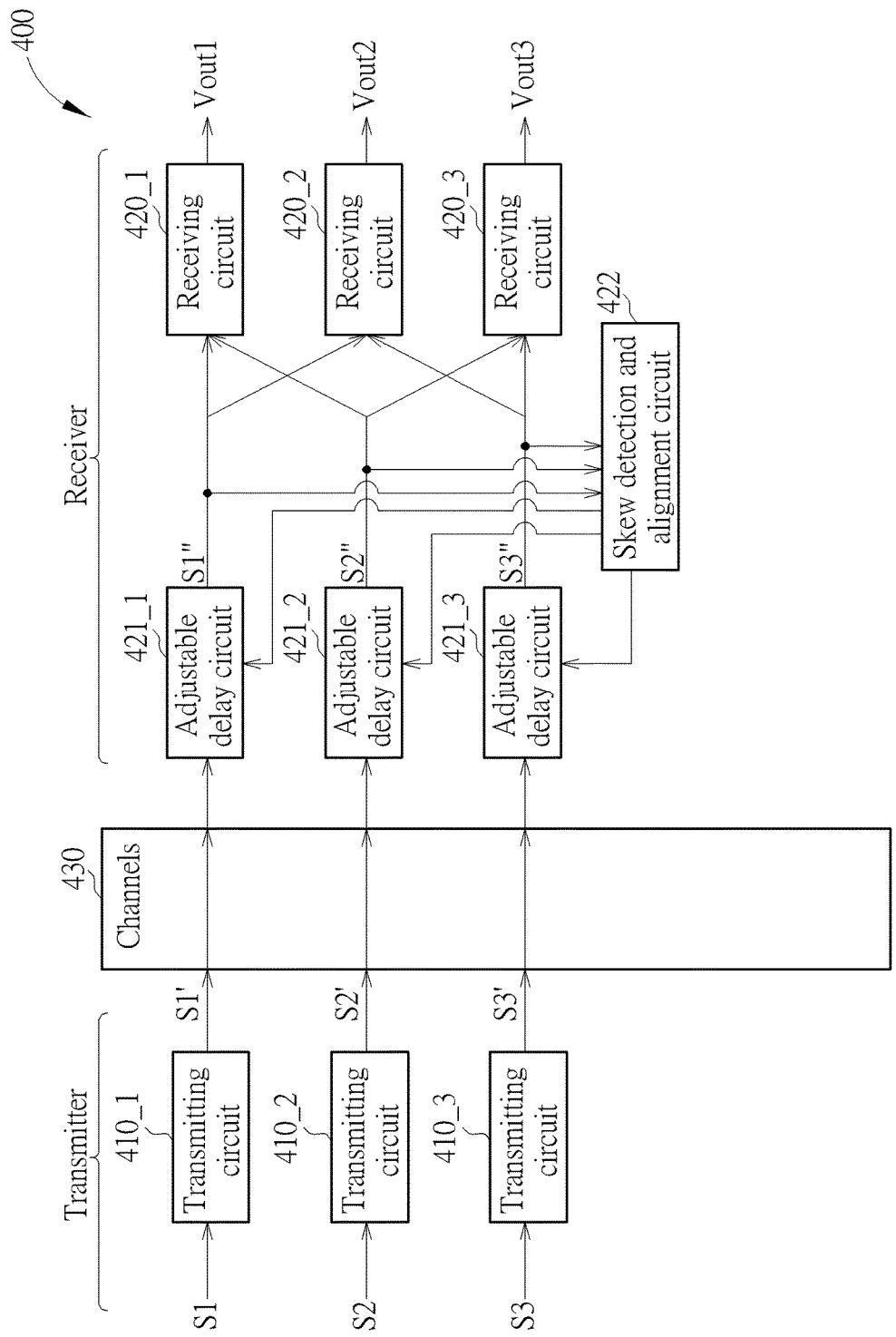
FIG. 4 is a diagram illustrating a system according to a fourth embodiment of the present invention.

FIG. 4 is a diagram illustrating a system 400 according to a fourth embodiment of the present invention. As shown in FIG. 4, the system 400 comprises a transmitter, a receiver and a plurality of channels 430 coupled between the transmitter and the receiver. The transmitter comprises three transmitting circuits 410_1-410_3. The receiver comprises three receiving circuits 420_1-420_3, a plurality of adjustable delay circuits 421_1-421_3 and a skew detection and alignment circuit 422. In this embodiment, without a limitation of the present invention, the system 400 complies with the C-PHY standard.

In the operations of the system 400, the transmitting circuits 410_1-410_3 serves as drivers to receive transmitting signals S1-S3 to generate signals S1'-S3', respectively. Then, the adjustable delay circuits 421_1-421_3 delay the signals S1'-S3' to generate the delayed signals S1"-S3", respectively. Then, the receiving circuit 420_1 receives the delayed signals S1" and S2" to generate an output signal Vout1, the receiving circuit 420_2 receives the delayed signals S1" and S3" to generate an output signal Vout2, and the receiving circuit 420_3 receives the delayed signals S2" and S3" to generate an output signal Vout3. In this embodiment, each of the receiving circuits 420_1-420_3 is implemented by a comparator for comparing the received two delayed signals to generate the output signal. In addition, the skew detection and alignment circuit 422 can determine the skew information of the delayed signals S1"-S3" to generate the skew information, and control the delay amounts of the adjustable delay circuits 421_1-421_3 according to the skew information. In this embodiment, the skew detection and alignment circuit 422 can use the signal having the earliest phase, latest phase or the middle phase to determine the skew information of the delayed signals S1"-S3". For example, if the delayed signal S1" has the earliest phase, the skew information may comprises the phase difference or delay amount between the delayed signals S1" and S2" and the phase difference or delay amount between the delayed signals S1" and S3". Then, the delay amounts of the adjustable delay circuit 421_1-421_3 can be controlled to lower the phase difference between the delayed signals S1"-S3", to improve the skew issue.

In the system 400, the communications between the transmitting circuits 410_1-410_3 and the receiving circuits 420_1-420_3 can be regarded as a main link, and the system 400 may have more than one main links, where each main link has a channel skew calibration mechanism mentioned above.

Figure 5:
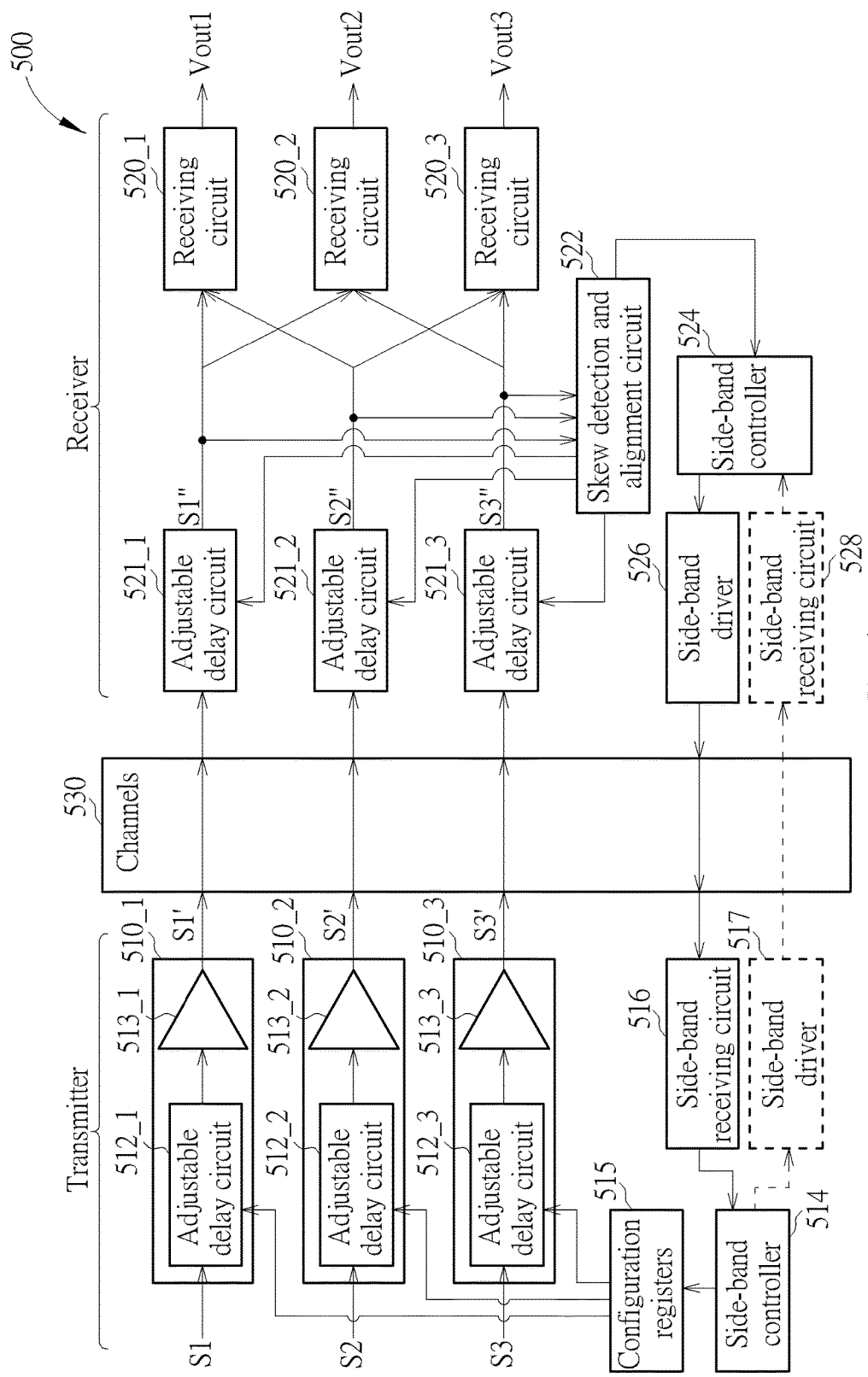
FIG. 5 is a diagram illustrating a system according to a fifth embodiment of the present invention.

FIG. 5 is a diagram illustrating a system 500 according to a fifth embodiment of the present invention. As shown in FIG. 5, the system 500 comprises a transmitter, a receiver and a plurality of channels 530 coupled between the transmitter and the receiver. The transmitter comprises three transmitting circuits 510_1-510_3, a side-band controller 514, a configuration registers 515, a side-band receiving circuit 516 and a side-band driver 517, where the transmitting circuit 510_1 comprises an adjustable delay circuit 512_1 and a driver 513_1, the transmitting circuit 510_2 comprises an adjustable delay circuit 512_2 and a driver 513_2, and the transmitting circuit 510_3 comprises an adjustable delay circuit 512_3 and a driver 513_3. The receiver comprises three receiving circuits 520_1-520_3, adjustable delay circuits 521_1-521_3, a skew detection and alignment circuit 522, a side-band controller 524, a side-band driver 526 and a side-band receiving circuit 528. In this embodiment, without a limitation of the present invention, the system 500 complies with the C-PHY standard.

In the operations of the system 500, first, the transmitting circuits 510_510_3 are arranged to receive transmitting signals S1-S3 to generate signals S1'-S3', respectively. In detail, the adjustable delay circuit 512_1 delays the transmitting signal S1 to generate the signal S1' via the driver 513_1, the adjustable delay circuit 512_2 delays the transmitting signal S2 to generate the signal S2' via the driver 513_2, and the adjustable delay circuit 512_3 delays the transmitting signal S3 to generate the signal S3' via the driver 513_3. Then, the adjustable delay circuits 521_1-521_3 delay the signals S1'-S3' to generate the delayed signals S1"-S3", respectively. Then, the receiving circuit 520_1 receives the delayed signals S1" and S2" to generate an output signal Vout1, the receiving circuit 520_2 receives the delayed signals S1" and S3" to generate an output signal Vout2, and the receiving circuit 520_3 receives the delayed signals S2" and S3" to generate an output signal Vout3. In this embodiment, each of the receiving circuits 520_1-520_3 is implemented by a comparator for comparing the received two delayed signals to generate the output signal. In addition, the skew detection and alignment circuit 522 can determine the skew information of the delayed signals S1"-S3" to generate the skew information, and control the delay amounts of the adjustable delay circuits 521_1-521_3 according to the skew information. In this embodiment, the skew detection and alignment circuit 522 can use the signal having the earliest phase, latest phase or the middle phase to determine the skew information of the delayed signals S1"-S3". For example, if the delayed signal S1" has the earliest phase, the skew information may comprises the phase difference or delay amount between the delayed signals S1" and S2" and the phase difference or delay amount between the delayed signals S1" and S3". Then, the skew detection and alignment circuit 522 transmits the skew information to the side-band controller 524. Then, the side-band controller 524 transmits the skew information to the transmitter via the side-band driver 526, and the side-band controller 514 of the transmitter receives the skew information via the side-band receiving circuit 516, and generates the control parameters to the configuration registers 515, for controlling delay amounts of the adjustable delay circuit 512_1-512_3. The above-mentioned steps are performed to improve the skew issue caused by the paths between the transmitter and the receiver, to lower the phase difference between the signals S1"-S3".

In the embodiment shown in FIG. 5, both the transmitter and the receiver have the adjustable delay circuits for delaying the signals to improve the skew issue, so the skew calibrations may be more flexible and precise.

In addition, the side-band driver 517 of the transmitter and the side-band receiving circuit 528 of the receiver are used to confirm that the side-band controller 514 successfully receives the skew information. For example, after receiving the skew information, the side-band controller 514 will transmit a signal to the side-band controller 524 of the receiver via the side-band driver 517 and the side-band receiving circuit 528 to tell the receiver that the skew information is successfully received. It is noted that the side-band driver 517 and the side-band receiving circuit 528 are optional devices, that is, the side-band driver 517 and the side-band receiving circuit 528 can be removed from the system 500 without affecting the normal operations.

In the system 500, the communications between the transmitting circuits 510_1-510_3 and the receiving circuits 520_1-520_3 can be regarded as a main link, and the communication between the side-band controllers 514 and 524 can be regarded as a side-band link. In some embodiments, the side-band link may use a dedicated single wire or a plurality of wires for communications, the side-band link may be single direction or bi-direction, or the side-band link and the main link may share one or more wires within the channels 530. In addition, the system 500 may have more than one main links.

Figure 6:
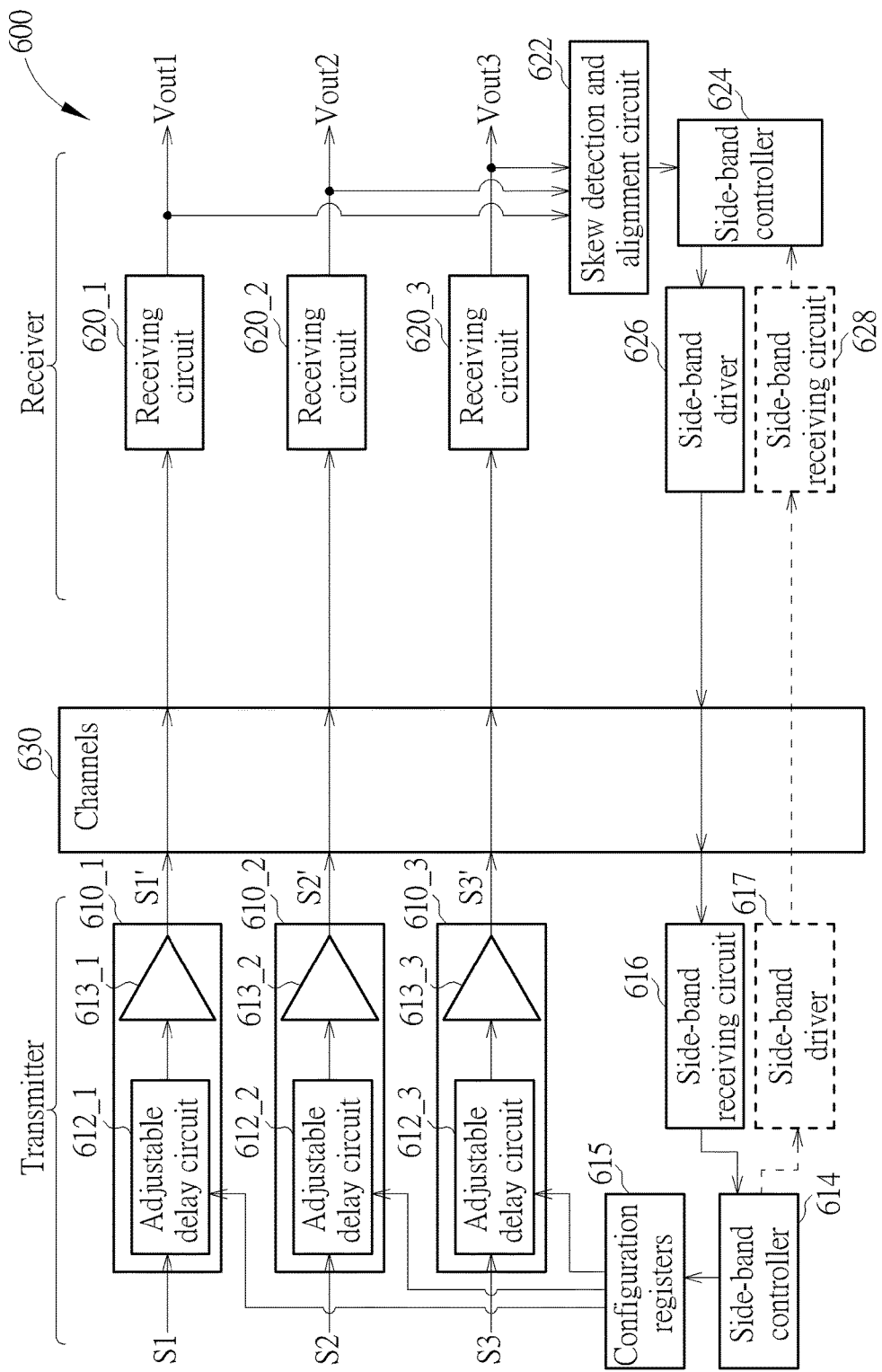
FIG. 6 is a diagram illustrating a system according to a sixth embodiment of the present invention.

FIG. 6 is a diagram illustrating a system 600 according to a sixth embodiment of the present invention. As shown in FIG. 6, the system 600 comprises a transmitter, a receiver and a plurality of channels 630 coupled between the transmitter and the receiver. The transmitter comprises three transmitting circuits 610_1-610_3, a side-band controller 614, a configuration registers 615, a side-band receiving circuit 616 and a side-band driver 617, where the transmitting circuit 610_1 comprises an adjustable delay circuit 612_1 and a driver 613_1, the transmitting circuit 610_2 comprises an adjustable delay circuit 612_2 and a driver 613_2, and the transmitting circuit 610_3 comprises an adjustable delay circuit 612_3 and a driver 613_3. The receiver comprises three receiving circuits 620-1-620_3, a skew detection and alignment circuit 622, a side-band controller 624, a side-band driver 626 and a side-band receiving circuit 628. In this embodiment, without a limitation of the present invention, the system 600 complies with the C-PHY standard.

In the operations of the system 600, first, the transmitting circuits 610_1_610_3 are arranged to receive transmitting signals S1-S3 to generate signals S1'-S3', respectively. In detail, the adjustable delay circuit 612_1 delays the transmitting signal S1 to generate the signal S1' via the driver 613_1, the adjustable delay circuit 612_2 delays the transmitting signal S2 to generate the signal S2' via the driver 613_2, and the adjustable delay circuit 612_3 delays the transmitting signal S3 to generate the signal S3' via the driver 613_3. Then, the receiving circuits 620_1_620_3 receives the signals S1'-S3' to generate output signals Vout1-Vout3, respectively. In addition, the skew detection and alignment circuit 622 determines the skew information of the signals S1'-S3' according to the output signals Vout1-Vout3 (it is assumed that the skew conditions of output signals Vout1-Vout3 are the same as the skew conditions of the signals S1'-S3'), and transmits the skew information to the side-band controller 624. In this embodiment, the skew detection and alignment circuit 622 can use the signal having the earliest phase, latest phase or the middle phase to determine the skew information of the output signals Vout1-Vout3. For example, if the output signal Vout1 has the earliest phase, the skew information may comprises the phase difference or delay amount between the output signals Vout1 and Vout2 and the phase difference or delay amount between the output signals Vout1 and Vout3. Then, the side-band controller 624 transmits the skew information to the transmitter via the side-band driver 626, and the side-band controller 614 of the transmitter receives the skew information via the side-band receiving circuit 616, and generate the control parameters to the configuration registers 615, for controlling delay amounts of the adjustable delay circuit 612_1-612_3. The above-mentioned steps are performed to improve the skew issue caused by the paths between the transmitter and the receiver, to lower the phase difference between the output signals Vout1-Vout3 (i.e. lower the phase difference between the signals S1'-S3').

In addition, the side-band driver 617 of the transmitter and the side-band receiving circuit 628 of the receiver are used to confirm that the side-band controller 614 successfully receives the skew information. For example, after receiving the skew information, the side-band controller 614 will transmit a signal to the side-band controller 624 of the receiver via the side-band driver 617 and the side-band receiving circuit 628 to tell the receiver that the skew information is successfully received. It is noted that the side-band driver 617 and the side-band receiving circuit 628 are optional devices, that is, the side-band driver 617 and the side-band receiving circuit 628 can be removed from the system 600 without affecting the normal operations.

In the system 600, the communications between the transmitting circuits 610_1-610_3 and the receiving circuits 620_1-620_3 can be regarded as a main link, and the communication between the side-band controllers 614 and 624 can be regarded as a side-band link. In some embodiments, the side-band link may use a dedicated single wire or a plurality of wires for communications, the side-band link may be single direction or bi-direction, or the side-band link and the main link may share one or more wires within the channels 630. In addition, the system 600 may have more than one main links.

Figure 7:
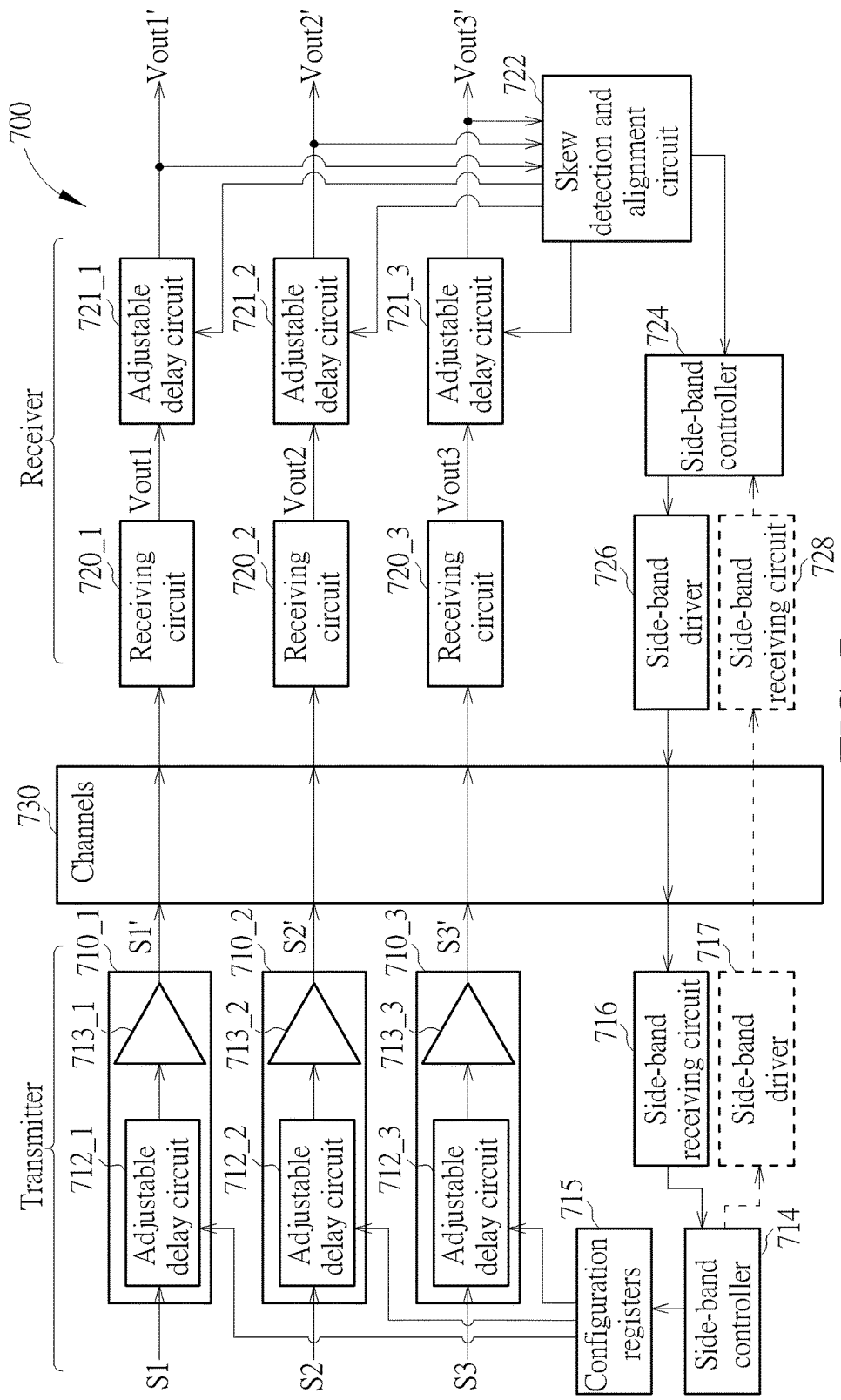
FIG. 7 is a diagram illustrating a system according to a seventh embodiment of the present invention.

FIG. 7 is a diagram illustrating a system 700 according to a seventh embodiment of the present invention. As shown in FIG. 7, the system 700 comprises a transmitter, a receiver and a plurality of channels 730 coupled between the transmitter and the receiver. The transmitter comprises three transmitting circuits 710_1-710_3, a side-band controller 714, a configuration registers 715, a side-band receiving circuit 716 and a side-band driver 717, where the transmitting circuit 710_1 comprises an adjustable delay circuit 712_1 and a driver 713_1, the transmitting circuit 710_2 comprises an adjustable delay circuit 712_2 and a driver 713_2, and the transmitting circuit 710_3 comprises an adjustable delay circuit 712_3 and a driver 713_3. The receiver comprises three receiving circuits 720_1-720_3, adjustable delay circuits 721_1-721_3, a skew detection and alignment circuit 722, a side-band controller 724, a side-band driver 726 and a side-band receiving circuit 728. In this embodiment, without a limitation of the present invention, the system 700 complies with the C-PHY standard.

In the operations of the system 700, first, the transmitting circuits 710_710_3 are arranged to receive transmitting signals S1-S3 to generate signals S1'-S3', respectively. In detail, the adjustable delay circuit 712_1 delays the transmitting signal S1 to generate the signal S1' via the driver 713_1, the adjustable delay circuit 712_2 delays the transmitting signal S2 to generate the signal S2' via the driver 713_2, and the adjustable delay circuit 712_3 delays the transmitting signal S3 to generate the signal S3' via the driver 713_3. Then, the receiving circuits 720_1-720_1 receives the signals S1'-S3' to generate output signals Vout1-Vout3, respectively. Then, The adjustable delay circuits 721_1-721_3 delay the output signals Vout1-Vout3 to generate delayed output signals Vout1'-vout3'. In addition, because of different channel lengths for transmitting the signals S1'-S3', the signals S1'-S3' received by the receiving circuits 720_1-720_3 may have the skew issue, and the output signals Vout1-Vout3 or the delayed output signals Vout1'-Vout3' may also have the skew problem. To solve this problem, the skew detection and alignment circuit 722 determines the skew information of the delayed output signals Vout1'-vout3', and controls the delay amounts of the adjustable delay circuits 721_1-721_3 according to the skew information. In this embodiment, the skew detection and alignment circuit 722 can use the signal having the earliest phase, latest phase or the middle phase to determine the skew information of the delayed output signals Vout1'-Vout3'. For example, if the delayed output signals Vout1' has the earliest phase, the skew information may comprises the phase difference or delay amount between the delayed output signals Vout1' and Vout2' and the phase difference or delay amount between the delayed output signals Vout1' and Vout3'. In addition, the skew detection and alignment circuit 722 further transmits the skew information to the side-band controller 724. Then, the side-band controller 724 transmits the skew information to the transmitter via the side-band driver 726, and the side-band controller 714 of the transmitter receives the skew information via the side-band receiving circuit 716, and generate the control parameters to the configuration registers 715, for controlling delay amounts of the adjustable delay circuit 712_1-712_3. The above-mentioned steps are performed to improve the skew issue caused by the paths between the transmitter and the receiver, to lower the phase difference between the delayed output signals Vout1'-Vout3'.

In addition, the side-band driver 717 of the transmitter and the side-band receiving circuit 728 of the receiver are used to confirm that the side-band controller 714 successfully receives the skew information. For example, after receiving the skew information, the side-band controller 714 will transmit a signal to the side-band controller 724 of the receiver via the side-band driver 717 and the side-band receiving circuit 728 to tell the receiver that the skew information is successfully received. It is noted that the side-band driver 717 of the transmitter and the side-band receiving circuit 728 are optional devices, that is, the side-band driver 717 of the transmitter and the side-band receiving circuit 728 can be removed from the system 700 without affecting the normal operations.

In the system 700, the communications between the transmitting circuits 710_1-710_3 and the receiving circuits 720_1-720_3 can be regarded as a main link, and the communication between the side-band controllers 714 and 724 can be regarded as a side-band link. In some embodiments, the side-band link may use a dedicated single wire or a plurality of wires for communications, the side-band link may be single direction or bi-direction, and the side-band link and the main link may share one or more wires within the channels 730. In addition, the system 700 may have more than one main links.

Figure 8:
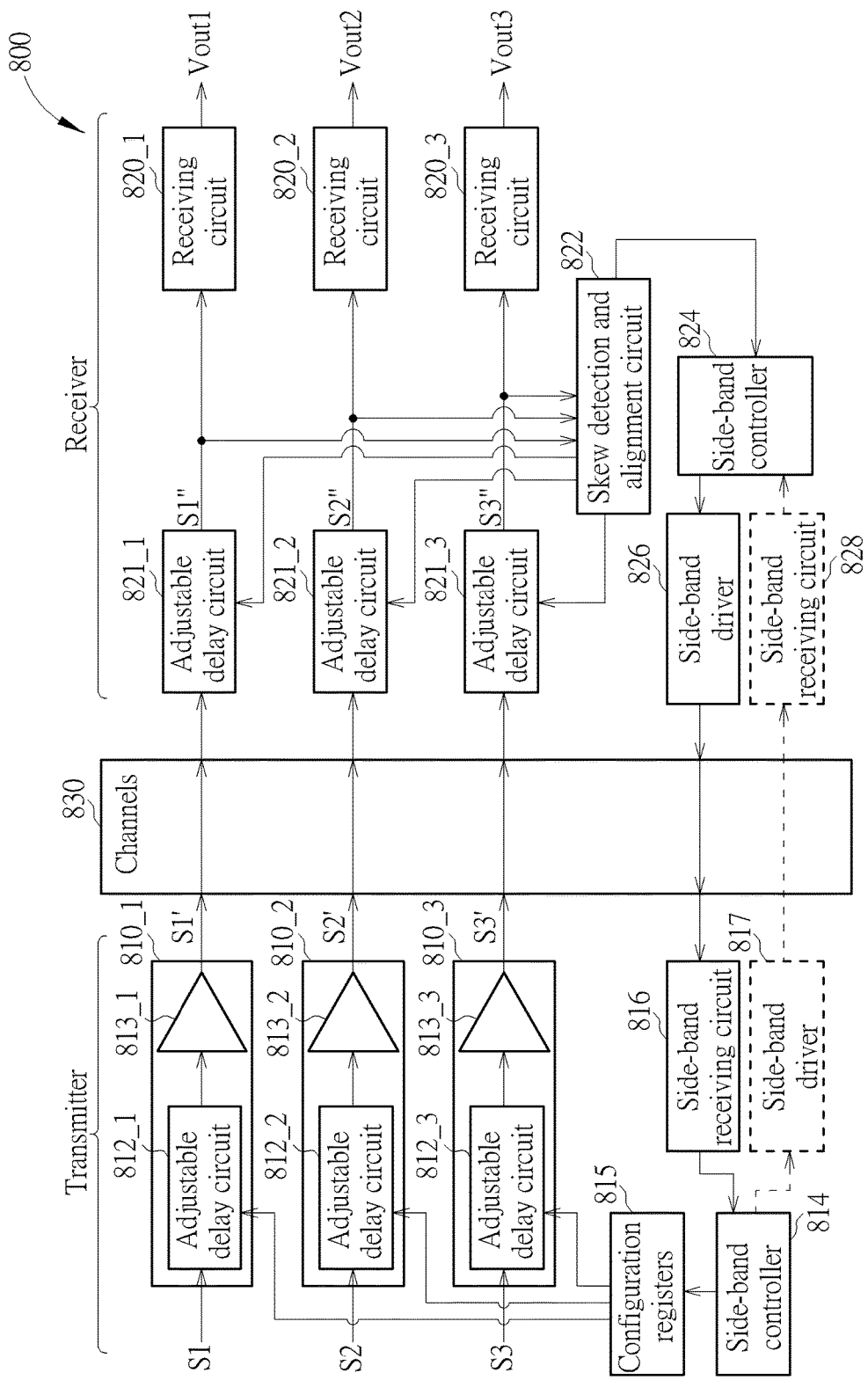
FIG. 8 is a diagram illustrating a system according to an eighth embodiment of the present invention.

FIG. 8 is a diagram illustrating a system 800 according to an eighth embodiment of the present invention. As shown in FIG. 8, the system 800 comprises a transmitter, a receiver and a plurality of channels 830 coupled between the transmitter and the receiver. The transmitter comprises three transmitting circuits 810_1-810_3, a side-band controller 814, a configuration registers 815, a side-band receiving circuit 816 and a side-band driver 817, where the transmitting circuit 810_1 comprises an adjustable delay circuit 812_1 and a driver 813_1, the transmitting circuit 810_2 comprises an adjustable delay circuit 812_2 and a driver 813_2, and the transmitting circuit 810_3 comprises an adjustable delay circuit 812_3 and a driver 813_3. The receiver comprises three receiving circuits 820_1-820_3, adjustable delay circuits 821_1-821_3, a skew detection and alignment circuit 822, a side-band controller 824, a side-band driver 826 and a side-band receiving circuit 828. In this embodiment, without a limitation of the present invention, the system 800 complies with the C-PHY standard.

In the operations of the system 800, first, the transmitting circuits 810_810_3 are arranged to receive transmitting signals S1-S3 to generate signals S1'-S3', respectively. In detail, the adjustable delay circuit 812_1 delays the transmitting signal S1 to generate the signal S1' via the driver 813_1, the adjustable delay circuit 812_2 delays the transmitting signal S2 to generate the signal S2' via the driver 813_2, and the adjustable delay circuit 812_3 delays the transmitting signal S3 to generate the signal S3' via the driver 813_3. Then, the adjustable delay circuits 821_1-821_3 delay the signals S1'-S3' to generate the delayed signals S1"-S3", respectively. Then, the receiving circuits 820_1-820_3 receive the delayed signals S1"-S3" to generate output signals Vout1-Vout3. In addition, the skew detection and alignment circuit 822 determines the skew information of the delayed signals S1"-S3" to generate the skew information, and controls the delay amounts of the adjustable delay circuits 821_1-821_3 according to the skew information. In this embodiment, the skew detection and alignment circuit 822 can use the signal having the earliest phase, latest phase or the middle phase to determine the skew information of the delayed signals S1"-S3". For example, if the delayed signal S1" has the earliest phase, the skew information may comprises the phase difference or delay amount between the delayed signals S1" and S2" and the phase difference or delay amount between the delayed signals S1" and S3". Then, the skew detection and alignment circuit 822 transmits the skew information to the side-band controller 824. Then, the side-band controller 824 transmits the skew information to the transmitter via the side-band driver 826, and the side-band controller 814 of the transmitter receives the skew information via the side-band receiving circuit 816, and generates the control parameters to the configuration registers 815, for controlling delay amounts of the adjustable delay circuit 812_1-812_3. The above-mentioned steps are performed to improve the skew issue caused by the paths between the transmitter and the receiver, to lower the phase difference between the signals S1"-S3".

In addition, the side-band driver 817 of the transmitter and the side-band receiving circuit 828 of the receiver are used to confirm that the side-band controller 814 successfully receives the skew information. For example, after receiving the skew information, the side-band controller 814 will transmit a signal to the side-band controller 824 of the receiver via the side-band driver 817 and the side-band receiving circuit 828 to tell the receiver that the skew information is successfully received. It is noted that the side-band driver 817 and the side-band receiving circuit 828 are optional devices, that is, the side-band driver 817 and the side-band receiving circuit 828 can be removed from the system 800 without affecting the normal operations.

In the system 800, the communications between the transmitting circuits 810_1-810_3 and the receiving circuits 820_1-820_3 can be regarded as a main link, and the communication between the side-band controllers 814 and 824 can be regarded as a side-band link. In some embodiments, the side-band link may use a dedicated single wire or a plurality of wires for communications, the side-band link may be single direction or bi-direction, or the side-band link and the main link may share one or more wires within the channels 830. In addition, the system 800 may have more than one main links.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver, comprising:
a plurality of receiving circuits, for receiving a plurality of input signals from a plurality of channels, wherein each of the receiving circuits receives at least one of the input signals to generate an output signal; and
a skew detection and alignment circuit, coupled to the plurality of receiving circuits, for determining skew information according to the output signals, wherein the skew information is used to control delay amounts corresponding to the output signals;
a plurality of adjustable delay circuits, wherein the plurality of adjustable delay circuits are coupled to the receiving circuits, and the plurality of adjustable delay circuits delays the output signals of the receiving circuits to generate a plurality of delayed output signals, respectively;
wherein the skew detection and alignment circuit determines the skew information according to the delayed output signals, and controls the plurality of adjustable delay circuits according to the skew information.

2. The receiver of claim 1, further comprising:
a side-band controller, coupled to the skew detection and alignment circuit, for transmitting the skew information to a transmitter for use of controlling delay amounts of a plurality of transmitting signals inputted to the channels.

3. The receiver of claim 2, wherein each of the receiving circuits receives two of the input signals to generate the output signal.

4. The receiver of claim 3, wherein the receiver satisfies a C-PHY specification, and each receiving circuit is implemented by a comparator for comparing the two of the input signals to generate the output signal.

5. The receiver of claim 1, wherein each of the receiving circuits receives two of the input signals to generate the output signal.

6. The receiver of claim 5, wherein the receiver satisfies a C-PHY specification, and each receiving circuit is implemented by a comparator for comparing the two of the input signals to generate the output signal.

7. A receiver, comprising:
a plurality of receiving circuits, for receiving a plurality of input signals from a plurality of channels, wherein each of the receiving circuits receives at least one of the input signals to generate an output signal; and
a skew detection and alignment circuit, coupled to the plurality of receiving circuits, for determining skew information according to the input signals, wherein the skew information is used to control delay amounts corresponding to the input signals;
a plurality of adjustable delay circuits, wherein the adjustable delay circuits are coupled between the channels and the receiving circuits, and the adjustable delay circuits delays the input signals to generate a plurality of delayed input signals, respectively;
wherein the skew detection and alignment circuit determines the skew information according to the delayed input signals, and controls the adjustable delay circuits according to the skew information.

8. The receiver of claim 7, wherein each of the receiving circuits receives two of the delayed input signals to generate the output signal.

9. The receiver of claim 8, wherein the receiver satisfies a C-PHY specification, and each receiving circuit is implemented by a comparator for comparing the two of the input signals to generate the output signal.

10. The receiver of claim 7, further comprising:
a side-band controller, coupled to the skew detection and alignment circuit, for transmitting the skew information to a transmitter for use of controlling delay amounts of a plurality of transmitting signals inputted to the channels.

11. The receiver of claim 10, wherein each of the receiving circuits receives two of the input signals to generate the output signal.

12. A signal processing method, comprising:
using a plurality of receiving circuit to receive a plurality of input signals from a plurality of channels, wherein each of the receiving circuits receives at least one of the input signals to generate an output signal; and
determining skew information according to the input signals, wherein the skew information is used to control delay amounts corresponding to the input signals;
using a plurality of adjustable delay circuits to delay the input signals to generate a plurality of delayed input signals, respectively; and
the step of determining the skew information according to the plurality of input signals comprises:
determining the skew information according to the delayed input signals; and controlling the plurality of adjustable delay circuits according to the skew information.

13. The signal processing method of claim 12, wherein the signal processing is executed in a receiver, and the signal processing method further comprises:
transmitting the skew information to a transmitter for use of controlling delay amounts of a plurality of transmitting signals inputted to the channels.

* * * * *